(No Model.)

C. CUTTRISS.
SECONDARY BATTERY.

No. 261,435.  Patented July 18, 1882.

WITNESSES
Wm. A. Skinkle
Geo. W. Breck

By his Attorney,
Frank L. Pope

INVENTOR
Charles Cuttriss

UNITED STATES PATENT OFFICE.

CHARLES CUTTRISS, OF LEEDS, COUNTY OF YORK, ENGLAND.

SECONDARY BATTERY.

SPECIFICATION forming part of Letters Patent No. 261,435, dated July 18, 1882.

Application filed May 1, 1882. (No model.)

*To all whom it may concern:*

Be it known that I, CHARLES CUTTRISS, a subject of the Queen of Great Britain, and a resident of Leeds, in the county of York, England, now temporarily residing at Duxbury, in the county of Plymouth and State of Massachusetts, have invented a new and useful Improvement in Secondary Batteries, of which the following is a specification.

My invention relates to certain improvements in the construction of secondary or electrical storage-batteries, and in the process of preparing the polarizing-plates or electrodes therefor.

The object of the invention is to increase the electro-chemical capacity of the battery by constructing the plates in a manner to receive a greater electrical charge, and also to lessen the time required for completing the preliminary process of polarizing or the "breaking down" of the battery-plates.

My invention consists in constructing one or both of the battery-plates of bundles of thin lead turnings, lead wire or gauze, or of thin strips or scraps of lead lightly pressed together and united at one end to a solid strip of metal, which serves as a conductor for the attachment of the electrodes; and it also consists in subjecting the plates to a preliminary electrolytic action under the influence of suitable oxidizing agents, whereby one plate becomes coated with a film of metallic oxide or salt, while the surface of the other plate, which has preferably been previously peroxidized, is reduced to a porous or spongy consistency. The plates are in this manner prepared to receive a maximum electric charge immediately upon being placed in their respective cells, thus avoiding the necessity of subjecting them to the preliminary charging and discharging which has hitherto been found necessary. In order to form the films upon the plates, they are immersed in a chemical solution especially adapted for oxidizing the plates, and at the same time subjected to electrolysis by the application of a suitable electric current.

Figure 1:
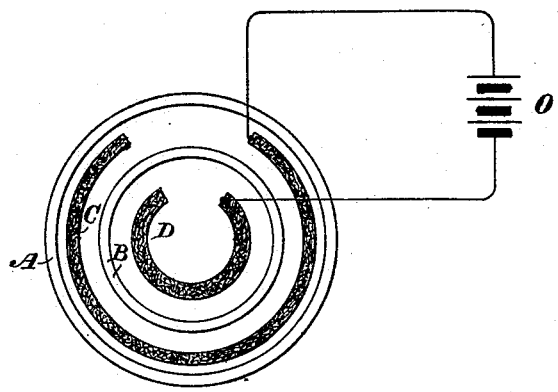
Figure 2:
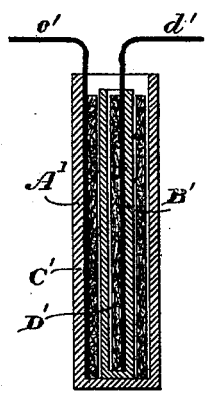
Figure 3:
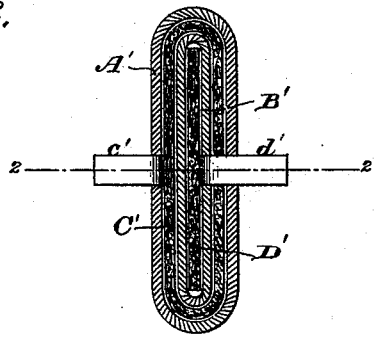

In the accompanying drawings, Figure 1 is a plan view of the electrolyzing-cell for preparing the plates. Fig. 2 is a vertical section of the secondary battery when complete, and Fig. 3 is a plan view of the same.

Referring to Fig. 1, A represents the outer containing cup of the polarizing-cell, and B an interior porous cup of unglazed earthenware. A plate of lead, C, is inserted into the space intervening between the two cups A and B, and a second lead plate, D, is placed in like manner within the interior porous cup, B. The inner cup, B, is filled with dilute sulphuric acid, and the space intervening between this cup and the outer containing cell, A, is filled with a suitable oxidizing agent, preferably consisting of a mixture of bichromate of potassium, dilute sulphuric acid, and nitric acid. A battery or other convenient generator of electricity, O, is connected with the plates, as indicated in the drawings, the positive or copper pole being united with the plate C and the negative or zinc pole with the plate D.

When the electric generator is applied to the electrolyzing-cell oxygen gas is set free at the plate C and hydrogen gas at the plate D. The nitric acid attacks the lead plate C in the outer vessel, forming nitrate of lead, and this, as soon as formed, is at once changed by the action of the bichromate of potassium and the oxygen into a deposit of peroxide of lead, which is distributed in a film or coating over the entire surface of the plate. The surface of the inner plate, D, is at the same time reduced by the action of the sulphuric acid forming sulphate of lead, from which a portion of the oxygen is set free by electrolytic action, and sulphuric acid is formed by the union of the sulphur and the remaining oxygen with the water, leaving a deposit of spongy metallic lead upon the surface of the plate. When a film of sufficient thickness has been produced upon the plate connected with the positive pole of the battery, the plate is removed from the solution and thoroughly washed in water, after which it may be immersed in dilute ammonia or other suitable alkali for the purpose of neutralizing the remaining acids or oxidizing agents, and thus preventing further chemical action upon the plates.

The particular electrolyte or oxidizing solution from which the best results have been obtained, and which I therefore prefer to employ as the best now known to me, in contact with the outer or negative plate, is a mixture consisting of one part sulphuric acid and nine parts saturated solution of bichromate of potassium, to which are added twenty drops of nitric acid for each ounce of the combined solution. The nitric acid assists in the process of oxidizing the plate, while the sulphuric acid not only assists in the formation of the film of peroxide of lead, but also materially reduces the internal resistance of the polarizing-cell.

After the plates have been formed in the manner hereinbefore described they are inserted into the cells of the secondary battery, as shown in Figs. 2 and 3. In these figures, A' represents the outer containing vessel, which is preferably flat or ovate, and B' is an interior porous cup, which is similar in shape to the jar A'. The positive or hydrogen plate C', which has been coated with a film of peroxide of lead, as already described, is placed in the space intervening between the two cells, and the porous negative or oxygen plate D' within the cell B', and both cells are filled with any suitable conducting-liquid. I prefer dilute sulphuric acid for this purpose, as it serves as an electrolyte by means of which the battery may be charged and discharged. Two conducting-electrodes, $c'$ $d'$, extend to the top of the battery from the plates C' and D', respectively, through which the necessary electrical connections are made.

For the purpose of charging the secondary battery any suitable electric generator may be connected therewith, the positive pole of the generator being connected with the plate D' in the porous cell B', and the negative pole with the plate C' in the outer cell, A'. The charging-current is allowed to flow until the gases are freely given off from the plates—hydrogen gas from the plate C' and oxygen gas from the plate D'. The generator is then disconnected and the secondary battery is ready for use.

In practice I prefer to construct the plates D' and C' of bundles of thin lead turnings lightly pressed together, or of lead wire, lead gauze, or other suitable scraps or porous form of lead, in order to facilitate a free circulation of the liquid and to promote the free escape of any gas not absorbed by the plates. I prefer to construct the hydrogen-plate of about twice the size of the oxygen-plate, for the reason that the amount of hydrogen which is liberated by the decomposition of the water is twice as great as that of the oxygen. The lower end of each plate is soldered to a thin strip of solid metal, which extends upward out of the jar for convenience in making the necessary electrical connections. These conductors are preferably covered or coated with a suitable non-conducting material, which will also resist the action of the chemicals used, thus preventing any chemical action upon the strips within the liquid.

I do not wish to confine myself to the use of the precise proportions of the ingredients which constitute the oxidizing agents hereinbefore mentioned, as the relative proportions may advantageously vary somewhat with the size of the plates and with the strength of charge with which it is intended to store the secondary battery.

I do not herein claim a secondary-battery plate of lead rendered porous by forming the same from thin scraps of lead pressed together, nor the combination of the same with the containing cup and the intervening cup, as I intend to embody and claim the same in an application to be hereafter filed by me.

I claim as my invention—

1. The hereinbefore-described process of coating plates or electrodes for secondary batteries, which consists in immersing the same in an oxidizing solution consisting of a mixture of sulphuric acid, bichromate of potassium, nitric acid, and water, and subjecting them at the same time to electrical action.

2. The oxidizing solution for coating secondary-battery plates hereinbefore set forth, consisting of a mixture of sulphuric acid, nitric acid, and bichromate of potassium, with or without the addition of water.

CHARLES CUTTRISS.

Witnesses:
 ELMER P. HOWE,
 F. G. WHISTON.